United States Patent Office 3,734,723
Patented May 22, 1973

3,734,723
COMPACTED AND SINTERED POWDER MASS HAVING A DISCRETE CAVITY IN THE MASS AND METHOD OF FORMING
Earl B. Blasch, Colonie, Richard M. Klingaman, Tonawanda, and Daniel M. Page, Cohoes, N.Y., assignors to the United States of America as represented by the Secretary of the Army
No Drawing. Filed Sept. 4, 1970, Ser. No. 69,977
Int. Cl. B22f 1/00
U.S. Cl. 75—214   10 Claims

ABSTRACT OF THE DISCLOSURE

A structure and method of forming the structure of a compacted and sintered powder mass having one or more discrete cavities in the mass. Each cavity within the mass is formed by the vaporization through sintering of a core material compacted within the powder mass prior to sintering.

DEDICATORY CLAUSE

The invention described herein may be manufactured, used, and licensed by or for the Government for governmental purposes without the payment to us of any royalty thereon.

SPECIFICATION

Our invention relates to a compacted and sintered structure and the method of forming a discrete cavity in the structure.

While numerous machining and fabrication techniques are known in the prior art, such as disclosed in U.S. patent application Ser. No. 51,460, filed July 1, 1970, no prior art technique or machined structure is known which is produced without utilizing a machine tool, such as a drill, to produce a structure such as the inventive structure subsequently described. Our invention was conceived and reduced to practice to solve the above discussed problem and to satisfy the long felt need for a sintered structure having one or more cavities formed in the structure without necessitating utilization of any machine tool to form the cavities.

Our inventive structure and method has utility for any application requiring a sintered structure requiring one or more cavities therein for any purpose such as to use the cavity as a container means to hold a material, to use the cavity as a mounting means to insert a rod or bolt means through the cavity, etc.

The principal object of our invention is to provide a structure which is formed by an effective and efficient sintering process.

Another object of our invention is to provide a structure which is formed without requiring any machine tool finishing thereof.

Other objects of our invention will be obvious or will appear from the specification hereinafter set forth.

We unexpectedly discovered that we could form our structure without the use of machine tools by charging a powder into a die; compacting the powder with a predetermined pressure selected within the skill of the art according to the particular powder compacted and the degree of compaction sought; placing a core on the compacted powder, the core being selected within the skill of the art of such dimensions and geometric configuration to form the predetermined size and shape of cavity sought in the final structure, the core being any material having a minimal solubility with the compacted powder up to and including a sintering temperature subsequently described and being a material which will vaporize at or below the subsequently described sintering temperature; adding additional powder superimposed on the core in a predetermined quantity to form the sought structure, compacting the composite sandwich of materials at a predetermined pressure selected within the skill of the art according to the particular materials compacted and the degree of compaction sought; and vacuum sintering in the conventional manner at a predetermined vacuum, time, and temperature parameter selected within the skill of the art in accordance with the particular materials used and the degree of sintering required. Upon completion of sintering, it was unexpectedly found that the core had been removed through vaporization to leave a discrete cavity within the structure. A conventional lubricant, such as Sterotex, can be added to the powder to be compacted as desired.

EXAMPLE

A powder mixture was prepared consisting of 97% of 93-1-0 grade zirconium powder, 2% of 325 mesh molybdenum power, 1% of 325 mesh iron powder, and 1 gram of Sterotex per 100 grams of powder mixture; the prepared mixture being placed in a die. A ½" long piece of magnesium wire core having a diameter of approximately ⅛" diameter was placed in the compacting die and superimposed on the powder mixture, and the powder mixture and core were compacted by means of a ½" diameter die at 123,500 p.s.i. After evacuating and backfilling a conventional vacuum furnace with argon four times in the conventional manner, the compacted powder and the core were placed in the vacuum furnace and sintered at 750° C. with a vacuum of less than one micron for sixty-five minutes. Upon completion of sintering, a metal structure was formed having a discrete cavity therein.

The above example is to be considered as merely exemplary, and our invention is not limited to the specific materials recited therein. Other core materials such as, for example, an alloy of 95% tin and 5% lead, an alloy of 40% antimony and 60% lead, or any other suitable material or combinations of materials can be utilized in place of the magnesium core as well as any suitable powder composition for a given application can be substituted for the zirconium powder composition. Also any suitable sintering temperature range can be employed, such as 640° to 1535° C., and any suitable sintering time and vacuum condition can be employed; all parameters depending on the particular material and end product sought. Any conventional compaction technique can be employed such as direct cast molding or injection molding. Any number of cavities can be formed in a structure by using our technique.

It is obvious that other modifications can be made of our invention, and we desire to be limited only by the scope of the appended claims.

We claim:
1. A structure comprising a compacted powder mass of a core located within the powder mass; said powder mass consisting of 97% zirconium, 2% molybdenum, and 1% iron and said core being a material selected from the group of materials consisting of magnesium, an alloy of 95% tin and 5% lead, an alloy of 40% antimony and 60% lead, and combinations thereof.
2. The structure of claim 1 wherein the powder mass contains a lubricant.
3. The structure of claim 1 wherein the core is a material having a minimal solubility in the powder mass and is adapted to vaporize at a temperature no higher than a predetermined sintering temperature.
4. A method of forming a structure comprising the steps of charging a powder mass into a die, superimposing a core on the powder mass, compacting the powder mass and the core at a predetermined pressure, sintering the compacted powder mass and the core at a predetermined temperature and under vacuum condition of less than one micron for sixty-five minutes to vaporize the core and form a discrete cavity within the powder mass.

5. The method of claim 4 wherein a plurality of discrete cavities are formed.

6. The method of claim 4 wherein the compacting pressure is 123,500 p.s.i.

7. The method of claim 4 wherein the sintering temperature is in the range of 640° C. to 1535° C.

8. The method of claim 4 wherein an additional predetermined amount of the powder is superimposed on the core prior to the compacting step.

9. The method of claim 4 wherein the method is carried out by direct cast molding.

10. The method of claim 4 wherein the method is carried out by injection molding.

References Cited

UNITED STATES PATENTS

| 3,345,160 | 10/1967 | Miccioli | 75—222 |
| 3,007,794 | 11/1961 | Gordon et al. | 75—222 X |
| 2,751,293 | 6/1956 | Haller | 29—182.1 X |
| 2,695,230 | 11/1954 | Haller | 75—222 |

FOREIGN PATENTS

| 897,342 | 5/1962 | Great Britain | 75—222 |
| 758,026 | 5/1967 | Canada | 75—222 |

CARL D. QUARFORTH, Primary Examiner

R. E. SCHAFER, Assistant Examiner

U.S. Cl. X.R.

29—182, 192; 75—200, 222, 225